United States Patent
Sun et al.

(10) Patent No.: US 8,340,461 B2
(45) Date of Patent: Dec. 25, 2012

(54) SINGLE IMAGE HAZE REMOVAL USING DARK CHANNEL PRIORS

(75) Inventors: Jian Sun, Beijing (CN); Kaiming He, Beijing (CN); Xiao-Ou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 12/697,575

(22) Filed: Feb. 1, 2010

(65) Prior Publication Data

US 2011/0188775 A1    Aug. 4, 2011

(51) Int. Cl.
*G06K 9/40*    (2006.01)

(52) U.S. Cl. ....... 382/275; 382/260; 382/274; 358/3.26; 358/3.27

(58) Field of Classification Search .......... 382/260, 382/274, 275; 358/3.26, 3.27, 463
See application file for complete search history.

(56) References Cited

U.S. PATENT DOCUMENTS

| 7,733,476 | B2 * | 6/2010 | Kanzaki et al. | 356/237.4 |
| 7,749,194 | B2 * | 7/2010 | Edwards et al. | 604/131 |
| 7,796,249 | B2 * | 9/2010 | Wang et al. | 356/237.2 |
| 8,194,233 | B2 * | 6/2012 | Bamji | 356/5.01 |
| 2010/0067823 | A1 | 3/2010 | Kopf et al. | |

FOREIGN PATENT DOCUMENTS

WO    WO2007083307 A2    7/2007

OTHER PUBLICATIONS

Chavez, "An Improved Dark-Object Subtraction Technique for Atmospheric Scattering Correction of Multispectral Data", Remote Sensing of Environment, 1988, vol. 24, Issue 3, pp. 459-479.

Fattal, "Single Image Dehazing", ACM, SIGGRAPH 2008, In the International Conference on Computer Graphics and Interactive Techniques, 2008, Article 72, 9 pgs.

Gabarda, et al., "A Model-Based Quality Improvement and Assessment of Hazy Degraded Images", EURASIP, In the 15th European Conference on Signal Processing, Sep. 2007, pp. 2234-2238.

Gabarda, et al., "Cloud Covering Denoising Through Image Fusion", Butterworth-Heinemann, Image and Vision Computing, May 2007, vol. 25, Issue 5, pp. 523-530.

Goldstein, "Sensation and Perception", Wadsworth Cengage Learning, 8th Edition, 2009, 100 pgs.

Goldstein, "Sensation and Perception", Wadsworth Cengage Learning, 8th Edition, 2009, 75 pgs.

Goldstein, "Sensation and Perception", Wadsworth Cengage Learning, 8th Edition, 2009, 50 pgs.

Goldstein, "Sensation and Perception", Wadsworth Cengage Learning, 8th Edition, 2009, 65 pgs.

(Continued)

*Primary Examiner* — Yosef Kassa
(74) *Attorney, Agent, or Firm* — Lee & Hayes, PLLC

(57) ABSTRACT

Techniques and technologies for de-hazing hazy images are described. Some techniques provide for determining the effects of the haze and removing the same from an image to recover a de-hazed image. Thus, the de-hazed image does not contain the effects of the haze. Some disclosed technologies allow for similar results. This document also discloses systems and methods for de-hazing images. Some of the disclosed de-hazing systems include an image capture device for capturing the hazy image and a processor for removing the effects of the haze from the hazy image. These systems store the recovered, de-hazed images in a memory and/or display the de-hazed images on a display. Some of the disclosed methods include removing the effects of the haze from a hazy image and outputting the recovered, de-hazed image.

20 Claims, 12 Drawing Sheets

OTHER PUBLICATIONS

Goldstein, "Sensation and Perception", Wadsworth Cengage Learning, 8th Edition, 2009, 59 pgs.

Hsu, et al., "Light Mixture Estimation for Spatially Varying White Balance", ACM, In the International Conference on Computer Graphics and Interactive Techniques, Session: Tone & Color, Article No. 70, 2008, 7 pgs.

Joshi, et al., "Seeing Mt. Rainier: Lucky Imaging for Multi-Image Denoising, Sharpening, and Haze Removal", Microsoft Research, 2009, Retrieved on May 27, 2010 at <<http://research.microsoft.com/en-us/um/people/cohen/seeingmtrainier.pdf>> 8 pgs.

Kopf, et al., "Deep Photo: Model-Based Photograph Enhancement and Viewing", Association for Computing Machinery Inc., Transactions on Graphics, Session : Fun With Single Images, Dec. 2008, vol. 27, Issue 5, Article 116.

Levin, et al., "A Closed-Form Solution to Natural Image Matting", In the IEEE Transaction on Pattern Analylsis and Machine Intelligence, Feb. 2008, vol. 30, No. 2, pp. 228-242.

Narasimhan, et al., "Chromatic Framework for Vision in Bad Weather", IEEE Computer Society, In the Conference on Computer Vision and Pattern Recognition, 2000, vol. 1, 8 pgs.

Narasimhan, et al., "Contrast Restoration of Weather Degraded Images", IEEE Computer Society, Transactions on Pattern Analysis and Machine Intelligence, Jun. 2003, vol. 25, No. 6, pp. 713-724.

Narasimhan, et al., "Interactive (De) Weathering of an Image Using Physical Models", IEEE Workshop on Color and Photometric Methods in Computer Vision, in Conjunction with ICCV, Oct. 2003, 8 pgs.

Narasimhan, et al., "Vision and the Atmosphere", Kluwer Academic Publishers, In the International Journal of Computer Vision, Jul.-Aug. 2002, vol. 48, Issue 3, pp. 233-254.

Nayar, et al., "Vision in Bad Weather", In the Proceedings of the Seventh IEEE International Confrence on Computer Vision, Sep. 1999, pp. 820-827 (8 pgs.).

Neubert, et al., "Atmospheric and Terrain Correction of Ikonos Imagery Using ATCOR3", In the ISPRS Hannover Workshop 2005, Retrieved on May 27, 2010 at <<http://www2.ioer.de/recherche/pdf/2005_neubert_meinel_isprs_hanover.pdf>> 6 pgs.

Preetham, et al., "A Practical Analytic Model for Daylight", ACM Press/Addison-Wesley Publishing Co., In the Proceedings of the 26th Annual Conference on Computer Graphics and Interactive Techniques, 1999, pp. 91-100.

Schaul, et al., "Color Image Dehazing Using the Near-Infrared", In the IEEE International Conference on Image Processing, Nov. 2009, pp. 1629-1632.

Schechner, et al., "Instant Dehazing of Images Using Polarization", In the Proceedings of the 2001 IEEE Computer Society Conference on Computer Vision and Pattern Recognition, Jun. 2001, pp. 325-332 (8 pgs.).

Shwartz, et al., "Blind Haze Separation", In the IEEE Computer Society Conference on Computer Vision and Pattern Recognition, vol. II, Jun. 2006, pp. 1984-1991.

Tan, "Visibility in Bad Weather From a Single Image", In the Proceedings of the IEEE Computer Society Conference on Computer Vision and Pattern Recognition, Jun. 2008, 8 pgs.

van Herk, "A Fast Algorithm for Local Minimum and Maximum Filters on Rectangular and Octagonal Kernels", Elsevier Science Inc., Pattern Recognition Letters, Jul. 1992, vol. 13, Issue 7, pp. 517-521.

* cited by examiner

SINGLE IMAGE HAZE REMOVAL USING DARK CHANNEL PRIORS

BACKGROUND

Haze in a scene obscures details and other information in the scene. For instance, the haze present in an outdoor scene which is characterized by heavy smog, fog, drizzle, smoke or other airborne particulate matter can obscure, and in extreme cases, hide objects in the scene. Distant objects suffer from the effects of haze more than closer objects since haze tends to be additive with distance. Thus, outdoor images tend to suffer from the effects of haze more than indoor images. Haze is possible, though, in many scenes depending on environmental factors too numerous to enumerate herein. As a result, in these images of hazy scenes, information regarding the scenes might be degraded or even lost.

Haze-induced information loss causes the performance of some image processing applications to suffer. For instance, object recognition applications may require more processing time; more robust algorithms, multiple images (or frames thereof for sequential images) of the captured scene, apriori geometric information of the scene, etc. to function properly. Thus, whereas a face-recognition application might recognize detect, identify, track, etc. a face with one particular frame of a haze-free sequential image, it might take that same algorithm several (or more) frames from a similar, but hazy, sequential image to recognize the face. Haze also affects the performance of remote sensing applications, surveying applications, and other geo-physical applications because of the predominance of outdoor images processed by these applications. Should the haze be of sufficient thickness, these algorithms might fail to perform their intended functions altogether.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

This document discloses techniques and technologies for de-hazing images. Some disclosed techniques provide for determining the effects of the haze and removing the same from an image to recover a de-hazed image. Thus, the de-hazed image does not contain the effects of the haze. Some disclosed technologies allow for similar results.

This document also discloses systems and methods for de-hazing images. Some of the disclosed de-hazing systems include an image capture device for capturing the hazy image and a processor for removing the effects of the haze from the hazy image. These systems store the recovered, de-hazed images in a memory and/or display the de-hazed images on a display. Some of the disclosed methods include removing the effects of the haze from a hazy image and outputting the recovered, de-hazed image.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

This document discloses systems and methods for removing the effects of haze from images (de-hazing images). More specifically, this document describes techniques and technologies which use dark channel priors to de-haze images. The dark channel priors of some embodiments include statistical treatments of the hazy images which allow estimation of the corresponding scenes as viewed (or captured by an image capture device) were the haze not present. More specifically still, some of these dark channel priors are based on observations that most local patches (arbitrarily sized groups of contiguous pixels) of hazy images contain some pixels which have a locally minimum intensity at a frequency other than the pre-dominate frequency of the airlight captured (along with the scene irradiance) in the hazy images.

Given a model of the hazy images and given a dark channel prior, algorithms of some embodiments estimate the thickness of the haze and recover a de-hazed version of the hazy image. These algorithms can also obtain a depth map of the captured scene from the hazy image. Moreover, these algorithms can do so using a single still image of the scene and/or a single frame of a sequential image (hereinafter a single image) of the scene.

De-Hazing Systems

Figure 1:
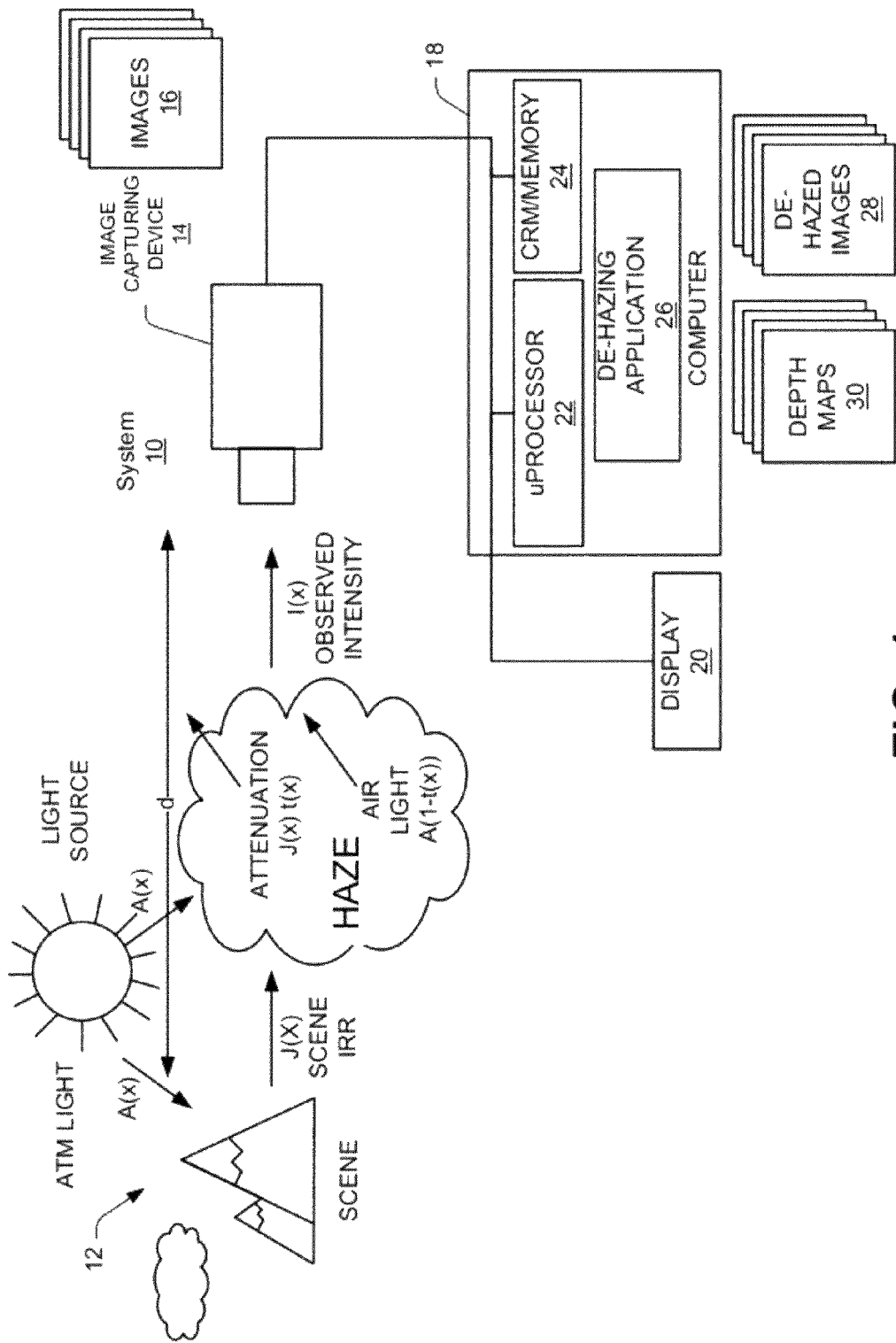
FIG. 1 is a block diagram illustrating an exemplary image de-hazing system.

With reference now to FIG. 1, a system 10 and a particular scene 12 are illustrated. Certain embodiments of system 10 of process images of the scene 12 to recover de-hazed images, depth maps, etc. from the images. The scene 12 is often eliminated by one light source such as the sun (for outdoor scenes). The scope of the disclosure includes indoor scenes 12 and scenes 12 illuminated by other light sources and by more than one light source. Various scenes 12 often include some haze between various objects and an image capture device 14 of the system 10. The image capture device 14 is configured to capture images 16 of the scene 12 and can be any type of image capture device (for instance, but not limited to, charge coupled devices).

The turbid media in which many outdoor (and other) scenes 12 reside degrades the images 16 of these scenes 12 as compared to images of the scenes 12 which might be captured in the absence of such turbidity. Briefly, in the absence of the turbidity, light reflected from (or generated by) objects in the scene 12 would travel directly to the image capture device 14 without attenuation (except for that attenuation caused by the divergence of the light as it travels from the objects) and without having other light superimposed therewith; however, turbid media causes both mechanisms. Moreover, even where the media is quite transparent (for instance, where the media is air) some turbidity may be present in the media because of particulate matter suspended in the media. Even transparent (and particulate free) media can exhibit some turbidity at the atomic/molecular level where light interacts with the atoms/molecules thereof. Thus, for outdoor scenes 12, some haze can exist, even on clear days.

More specifically, the turbid media absorbs some of the light reflected from the objects as it (the scene irradiance J) travels toward the image capture device 14. Meanwhile, the turbid media also scatters ambient light in the vicinity of the line of sight of the image capture device 14 into that line of sight. The ambient light is sometimes referred to as "atmospheric light", while the portion of the ambient light scattered into the image capture device 14 is sometimes referred to as "airlight." The current disclosure is not limited to scenes 12 in an (or the) atmosphere or to air. Rather, the scope of the current disclosure includes de-hazing systems 10 and methods for use with other media. As a result of the foregoing mechanisms (and others), an observed intensity I of the light arriving at the image capture device 14 includes a blend of the attenuated scene irradiance J and the airlight arriving at the image capture device 14.

Thus, the captured images 16 are colloquially said to be hazy; to be "washed out" with the background light; full of glare; blurred; etc. More precisely, the attenuation diminishes the intensity of the scene irradiance J captured by these images 16 while the airlight increases the overall observed intensity I of these images 16 without regard for the scene irradiance J. As a result, the images 16 are color-shifted toward the frequency(s) of the airlight and away from the frequencies of the scene irradiance J. These effects of haze (as well as others) obscure details of the scene 12, lessen the contrast in the images 16 thereof, and otherwise hide information that might otherwise be observable in the images 16 as well as in the scenes 12 themselves. As a result, human users perceive lower quality in the hazy images 16 while image processing applications suffer degraded performance while operating on such images 16.

With continuing reference to FIG. 1, as a depth d between objects in the scene 12 and the image capture device 14 increases, haze effects increase in strength. Moreover, many image processing applications (for example applications involving image analysis, feature detection, filtering, photometric analysis, etc.) perform better once haze effects have been removed from hazy images 16 to recover de-hazed images 28. Many such applications assume that the input image accurately captures the scene radiance J. The presence of haze in the scene 12 invalidates this assumption either across certain portions of images 16 or across the images 16 in their entirety. When haze invalidates this assumption, such image processing applications almost inevitably suffer decreased performance. The performance of such applications, therefore, depends on the materials, optical properties, concentration, location, and similar aspects of the media associated with the haze. Given wide variations in these considerations, the performance of image processing applications varies from situation to situation making the predictability, reliability, and precision of their results at least somewhat problematic.

System 10 of FIG. 1 illustrates techniques and technologies for removing, or at least decreasing, the effects of haze in images 16. More specifically, system 10 includes the image capture device 14 a computer 18, and a display 20. The computer further includes a processor 22 in communication with a memory 24 or other processor (or computer) readable storage medium and display 20. Within the computer 18, a de-hazing application 26, algorithm, module, routine, code, etc. executes on the processor 22 and resides in (or is stored in) the memory 24.

The system 10 interconnects the various components 14, 18, 20, 22, and 24 as shown along with supporting hardware (and software) not shown for purposes of clarity but commercially available. The system 10 captures images 16 of various scenes 12 with the image capture device 14 and stores them in the memory 24, displays them on the display 20.

The de-hazing application 26 includes processor executable instructions which when executed by the processor 22 de-haze images 16 in whole or in part. More specifically, the de-hazing application 26 de-hazes the images 16 and stores the resulting de-hazed images 28 in memory 24 and displays them on the display 20. By doing so, the de-hazing application 26 can be said to recover de-hazed images 28 from the images 16 input into (or captured by) the system 10. In addition, or in the alternative, the system 10 can recover depth maps 30 of the scene 12 for storage in the memory 24, for display on the display 20, etc.

De-Hazing Methods

Figure 2:
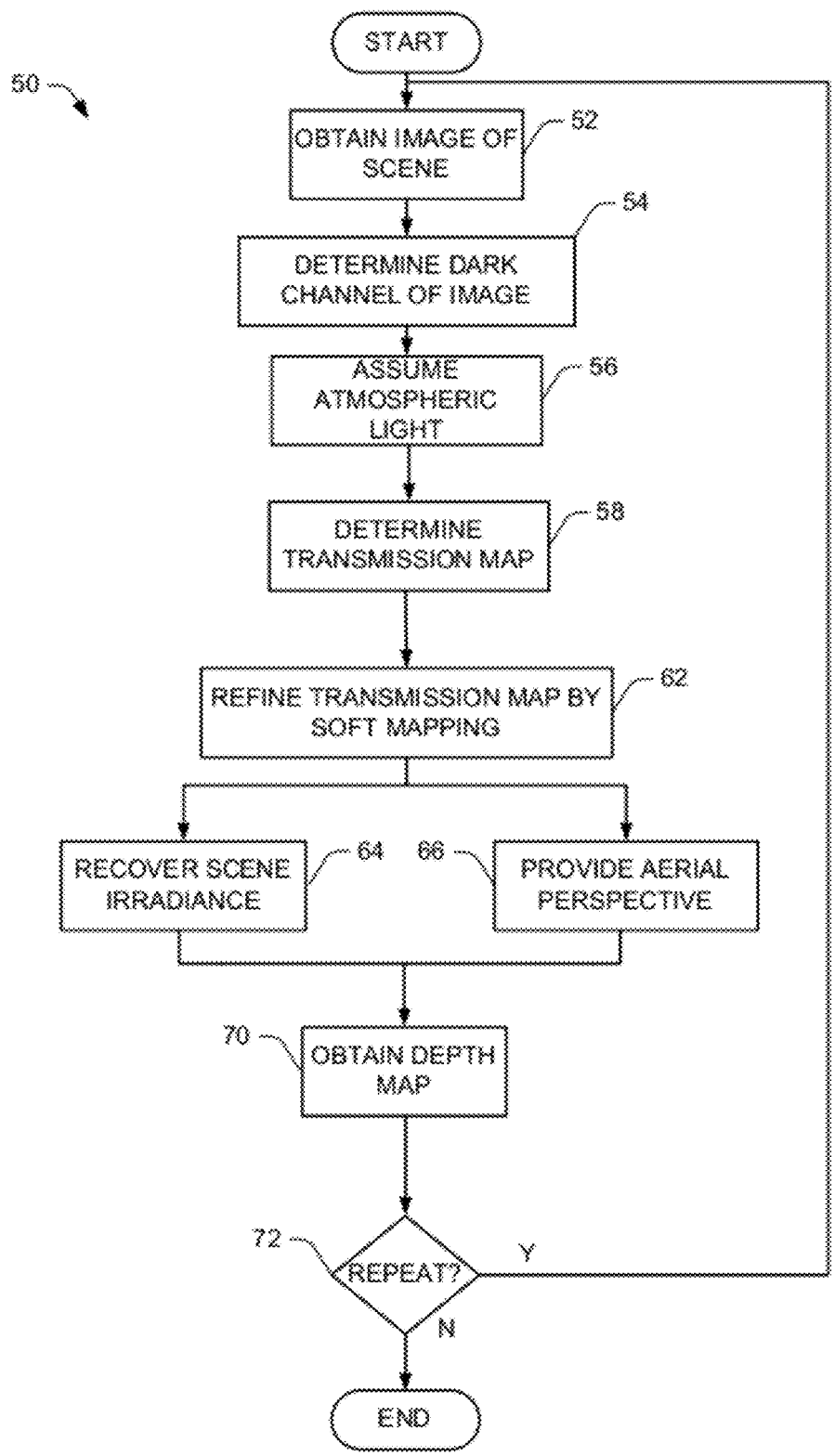
FIG. 2 is a flow chart illustrating an exemplary method of de-hazing images.

With reference now to FIG. 2, the de-hazing application 26 incorporates de-hazing methods such as method 50 of FIG. 2 in its instructions. Method 50 includes obtaining an image 16 of a scene 12. See reference 52. Image 16 can be a single still image or can be a frame of a sequential image such as a video recording. Typically, the image 16 includes at least some effects of haze which is present in the scene 12. These effects may vary with location in the scene 12 and more specifically with a depth d in the scene 12. The effects of haze in the image 16 can vary with other aspects of the scene 12 such as altitude (for instance, when atmospheric haze occurs in strata or layers), the presence of haze sources (factories and fires for instance), etc.

Method 50 also includes determining a dark channel for some or all of a set of pixels of the image 16 at reference 54. The nature of images 16 at the pixel level along with the dark channel will be disclosed further herein with reference to FIG. 3.

At reference 56, method 50 includes assuming some value for the intensity of the atmospheric light A illuminating the scene 12. Any reasonable estimate can suffice as method 50 can include determining or estimating the actual value of the atmospheric light A without further inputs beyond the single image 16 (as is disclosed further herein).

With continuing reference to FIG. 2, method 50 also includes determining a transmission map of the scene 12 from the image 16. The transmission t of the scene 12 measures the effects of the haze in terms of attenuation of the scene irradiance J and measures the scattering of atmospheric light A into the image 16. Thus, the transmission t provides a measure of the denseness, thickness, etc. of the haze in the scene as captured in the image 16. See reference 58.

As will be further disclosed herein, some dark channel priors of the current embodiment may not necessarily be valid for sky portions of the image 16. That is, for portions of the image 16 corresponding to the sky as viewed in the scene 12, there might not exist a physically valid dark channel prior for some pixels thereof. Therefore, method 50 may include provisions for accounting for the sky regions. As it happens, the dark channel prior of the current embodiment leads to a valid result even if applied to sky regions of the image 16.

Reference 62 of FIG. 2 illustrates that the transmission map obtained with reference to 58 may be refined by a soft matting technique(s). Soft matting allows the transmission map to be estimated for, or extrapolated into, portions of the image 16 where a dark channel was not determined whether due to its unavailable (for instance, in sky portions) or because it was not determined. For instance, it might be desirable to only determine the dark channel for a representative sample of the pixels of the image 16. Such sampling might be desirable when the processing (or other resources) associated with determining the dark channel of a number of pixels exceeds the processing associated with soft matting the corresponding portion of the image 16.

At reference 64, method 50 includes recovering the scene irradiance J or an estimate thereof using the transmission map (see reference 58) and the assumption for the atmospheric light A (see reference 56). More specifically, method 50 may include inputting these values for a pixel of the image 16 (or matrices thereof corresponding to the image 16 or a portion thereof) into an image model and recover the scene irradiance J. Thus, one output obtained at reference 64 includes a de-hazed image 28 corresponding to the input image 16.

In some situations method 50 also includes providing aerial perspective to the image recovered at reference 64. Aerial perspective refers to depth clues which human users perceive from the effects of haze in the image 16. Thus, by leaving some of the effects of haze in the de-hazed image 28, method 50 allows users to at least partially perceive depth d in the de-hazed images. Method 50 can therefore de-haze the images 16 in part or in whole to obtained de-hazed images 28 (with or without aerial perspective). See 66.

Moreover, method 50 can include doing so using the transmission t of a sample of the pixels of the image 16 or from all of the pixels of the image 16. This estimate of the atmospheric light A can be used in further processing of the image 16, for processing other instances of the image 16, or for processing similar images 16, etc.

If desired, method 50 can also recover a depth map of the scene 12 or of the objects therein. Briefly, since the effects of haze largely depend on the depth d of objects in the scene 12 and since the transmission t corresponds to the effects of haze, the transmission map corresponds to a depth map of the scene 12. The depth d of objects in the scene 12 can therefore be determined (or estimated) from the transmission t of the scene 12. See reference 70.

Of course, method 50 can repeat for additional pixels of the image 16, for additional portions of the image 16, for other single images 16, or for other frames of a sequential image, etc. see reference 72. It is to be understood, that reference 72 (repeat) may not be needed for a single image, but can be. Also reference 72 (repeat) can apply for other sequential frames.

Haze, Depth, and Aeiral Perspective

Figure 3:
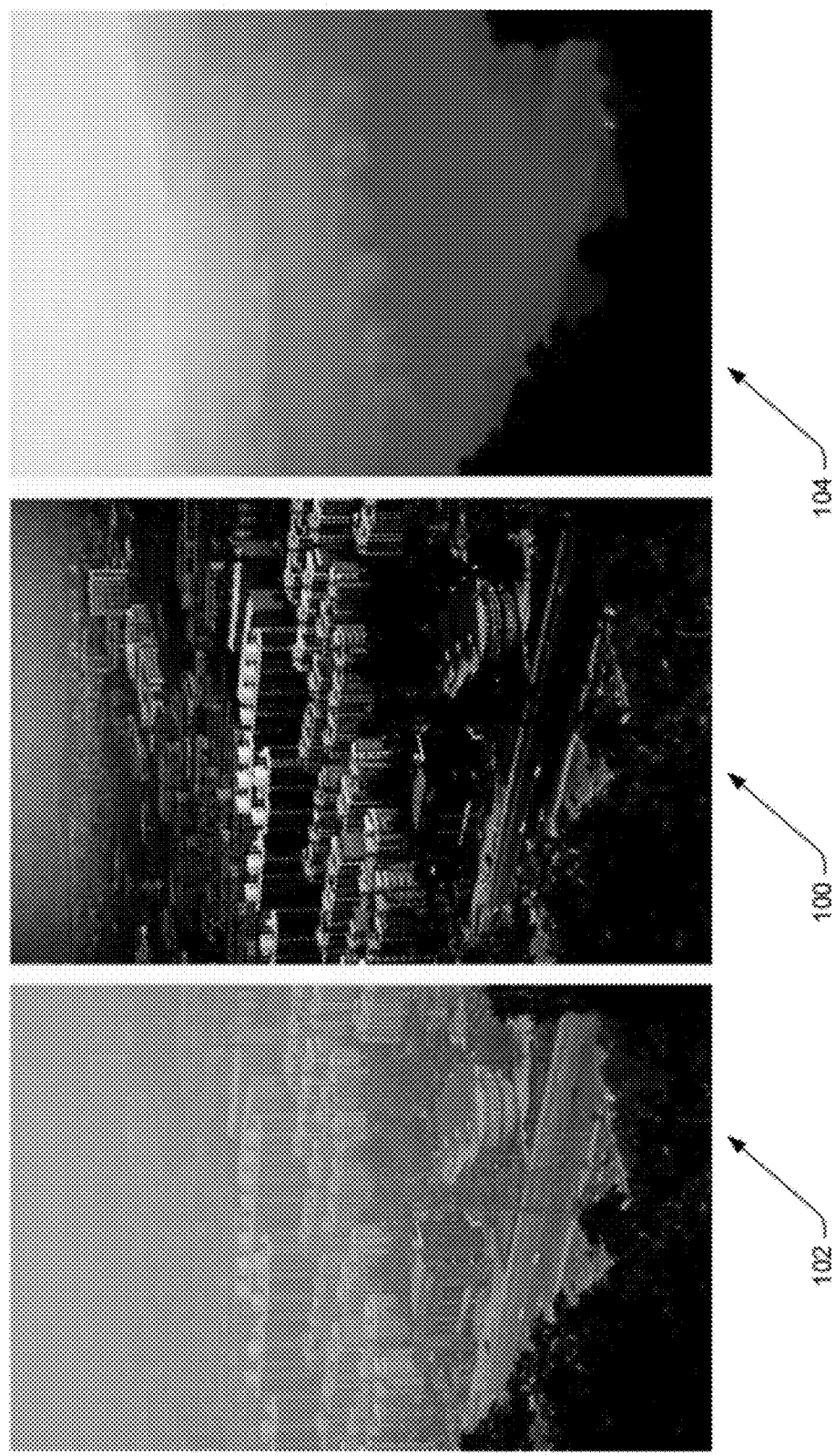
FIG. 3 is a diagram illustrating an exemplary hazy image, a de-hazed image, and a depth map of a scene.

With reference now to FIG. 3, the drawing illustrates a de-hazed image 100, a hazy image 102, and a depth map 104 of a scene 12, the de-hazed image 100 and the depth map 104 being recovered by system 10 and/or in accordance with method 50. In the de-hazed image 100 contrasts between adjacent objects (or visually different portions of the de-hazed image 100) tend toward their maximum whereas contrasts in the hazy image 102 lay somewhere below their corresponding maximums. In addition, the intensity of the colors of the various portions of the de-hazed image 100 lay at or near the intensities of the colors of the actual scene 12. In contrast, the colors in the hazy image 102 tend toward the overall color of the airlight. Often, though not always, the color of this haze is white or blue-white.

As a result, the hazy image 102 appears "blurred," "dim," "dull," or "washed out" with the blue-white (or other) color of the haze. In contrast, the de-hazed image 100 appears "crisp" and "bright." De-hazing hazy images 102, therefore, increases the human-perceived visibility of the scenes 12 and improves the color-fidelity (i.e., removes the haze-induced color shift) appearing in de-hazed images 100. In general, therefore, the de-hazed images 100 appear as visually more pleasing to human users and result in greater achievable functionality for many image processing applications.

With continuing reference to FIG. 3 and the depth map 104, methods of embodiments can obtain depth maps 104 of the scene 12 while (or in the alternative to) recovering de-hazed images 100 from hazy images 102. The depth d information in depth maps 104 often improves the performance of many image processing applications and might be useful for other reasons. Thus, to some extent, leaving some (depth d dependent) haze effects in de-hazed images 100 can be useful to some users and/or image processing applications. In the disclosure, therefore, the term "de-hazed image" 100 refers to an image in which at least some of the haze effects have been removed.

Thus, some embodiments provide de-hazing systems 10 for leaving selected amounts of haze effects in the recovered de-hazed image 100. These de-hazing systems 10 make use of an observation that haze (and its effects) depends on the depth d of the various objects in the scene 12. These depths d, though, happen to be unknown or difficult and expensive to obtain for many scenes 12. For instance, a depth model could be built for some scene 12 of interest. However, doing so necessarily requires the expenditure of resources that might better be employed elsewhere. Perhaps more importantly, if any aspect of the scene 12 changes, the image capturing device 14 moves, the users desire to image another scene 12, etc., then the depth model must be modified (or a new depth model must be built) accordingly.

Dark Channel Priors

Embodiments use dark channel priors thereby obviating the need for such efforts. Of course, a dark channel prior could be used in addition to other techniques and technologies. It might also be worth noting that statistics gathered from experimental observations underlie the dark channel priors of such embodiments. Experimental results from de-hazing systems 10 of some embodiments illustrate that these de-hazing systems 10 can recover the contrasts and colors of the underlying scenes 12. Further still, these de-hazing systems 10 can produce physically valid de-hazed images 100 and have proven to perform well even in the presence of heavy haze and while using only one hazy image 102 of a scene 12. Furthermore, these de-hazing systems 10 do so without relying on surface shading. Moreover, these de-hazing systems 10 perform well on hazy images 102 with significant variations in the haze from one region of the scenes 12 to another. Even under such circumstances, these de-hazing systems 10 produce little or no halo effects in the recovered de-hazed images 100.

Figure 4:
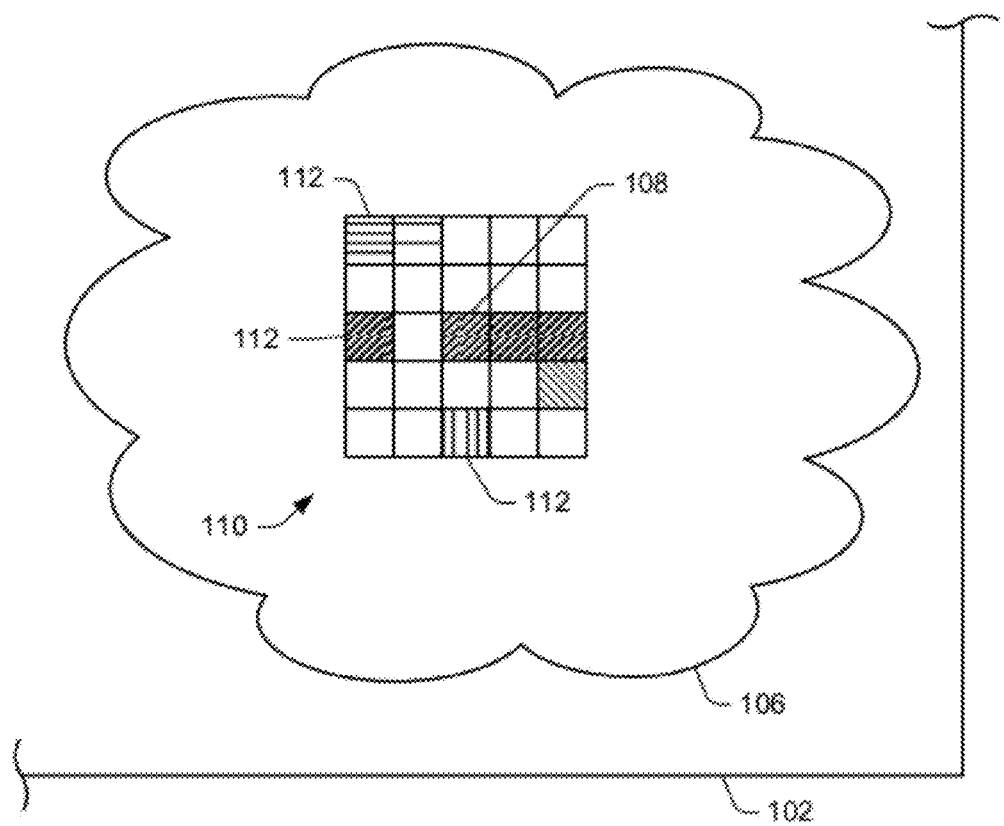
FIG. 4 is a diagram illustrating an exemplary portion of a hazy image.

With reference now to FIG. 4, the dark channel prior of some embodiments relates to observations that some pixels of hazy images 102 exhibit low intensity at one or more frequencies (i.e., colors) relative to the other colors of that pixel and/or in absolute terms. FIG. 4 illustrates a portion 106 of a hazy image 102 including a pixel 108 and a local patch 110 of the pixel and including other pixels 112. The pixels 108 and 112 of the local patch 110 typically capture differing intensities of differing colors as indicated by the various cross hatching patterns in these pixels 108 and 112. For instance, FIG. 4 illustrates that most of the pixels 108 and 112 extending horizontally across the middle of the local patch 110 happen to have captured the lowest intensities of the local patch 110 in the color channel illustrated by FIG. 4. These particular pixels 108 and 112 might, therefore, have captured a shadow, a monochromatic object, or an object from which no intensity otherwise arises in that color channel.

More particularly, in hazy images 102 captured using an RGB (red-blue-green) image capture device 14 (see FIG. 1), one color might contribute little to the overall observed intensity I of a particular pixel 108 or local patch 110. This result arises from such situations (and others) in which a particular color dominates the pixel 108 or local patch 110. For instance, in one illustrative situation, a pixel 108 captures a portion of a bright red automobile in a particular hazy image 102. Accordingly, the green and blue color channels of that pixel 108 contribute little intensity to that pixel 108. These minimal intensity color channels of the pixel 108 can, thus, be deemed dark channels of the pixel 108.

Furthermore, experimental results indicate that it can usually be assumed that airlight contributes nearly all of the intensity to the dark channel(s). In the red vehicle situation discussed above, either the blue or green color channel could be the dark channel with its intensity contribution being assumed to come from airlight alone. The other dark channel (perhaps the one exhibiting greater intensity than the other dark channel) could be used to verify the validity of the dark channel prior corresponding to this situation. This verification gains strength in situations where it is known (or suspected) that a nearly monochromatic object has been captured in a hazy image 102 or portion 106 thereof.

Since, typically, the only contributors to the observed intensity I of a given pixel are 1) light reflected from (or generated by) a portion of the scene 12 corresponding to the pixel 108 and 2) airlight arising between that region of the scene 12 and the image capture device 14, the dark channel intensity identified using the dark channel prior therefore provides an estimate of the airlight for that pixel 108. Using the dark channel prior and a model of the hazy image 102, embodiments recover the scene radiance J o the pixel 108. When applied across the hazy image 102 such techniques recover the de-hazed image 100. It has been found that determining the minimum intensity dark channel of the pixels 112 in the vicinity of the particular pixel 108 under consideration and using that intensity as the dark channel of the pixel 108 leads to satisfactory results. Additionally, some embodiments use soft matting techniques and technologies to refine the recovered de-hazed image 100.

Image Models for Use in De-Hazing Images

As disclosed previously, de-hazing systems 10 of some embodiments use a dark channel prior and a model of the hazy images 102 to recover the de-hazed images 100. One commonly used image model for hazy images 102 takes the form:

$$I(x)=J(x)t(x)+A(1-t(x)) \qquad \text{Eq. 1}$$

Where the symbols in Eq. 1 are further explained below. More specifically, I(x) is a vector or matrix of the observed intensity I of a hazy image 102. Accordingly, it represents all of the light reaching the image capture device 14 including energy from the scene irradiance J(x) and energy from the airlight. Of course, the contribution of the scene irradiance J(x) might be partially (or, in some circumstances, totally) attenuated by the media through which it travels before it reaches the image capture device 14.

Furthermore, x represents a particular portion of the hazy image 102. The reference x can therefore represent a pixel 108 or 112, a local patch 110, etc. of the hazy image 102 and the corresponding location in the observed scene 12. The reference x also indicates that the various terms to which it applies depend on the corresponding location in the scene 12 of the imaged objects. More particularly, the reference x implies that some depth d corresponds to the location x The reference J(x), as indicated above is the actual scene irradiance. Thus, the scene irradiance J(x) represents light leaving the objects in the scenes 12 as it begins traveling to the image capture device 14. The scene irradiance J(x), therefore, conveys the actual colors of these objects and the contrasts there between. Furthermore, by comparing the scene irradiance J(x) of adjacent regions in the scenes 12, the actual contrasts in the scenes 12 can be determined.

The reference A represents the atmospheric light which illuminates the scenes 12. In addition, the atmospheric light usually illuminates the media between the objects in the scenes 12 and the image capture device 14. Thus, at any given time, the atmospheric light A is usually treated as a constant. However, the atmospheric light A could vary with the region in the scenes 12, with time, etc.

Additionally, the reference t(x) represents the transmission of the medium through which light reaches the image capture device 14. The transmission t(x) is typically the transmission of air. However, the transmission t(x) can be the transmission of water or some other at least partially transparent media which surrounds the imaged objects in the scenes 12 (and/or which extends to optically infinite depths d from the image capture device 14). As such, it determines the portion of light traveling through a distance in the media that is not scattered from its original direction. Thus, the transmission t(x) is dependent on the length of the paths that the light travels through the media. Hence, Eq. 1 treats the transmission t(x) as a variable which depends on the location x in the scene 12. When the medium is homogenous, the transmission t(x) can be expressed as:

$$t(x)=e^{-\beta d(x)} \qquad \text{Eq. 2}$$

Where β is the scattering coefficient of the media. Since the depth d of the various objects varies, Eq. 2 treats the depth d as a variable d(x). Moreover, according to Eqs. 1 and 2, the transmission t(x) indicates that the media attenuates the scene irradiance J(x) exponentially with regard to the scene depth d(x). The scope of the disclosure, however, includes other relationships (for instance, linear, non-continuous, etc.) between the transmission t(x) and the depth d(x).

With further reference to Eq. 1, the first term J(x)t(x) on the right side of Eq. 1 represents the attenuation of the scene irradiance J(x) between the objects from which it originates and the image capture device 14. See R. Tan. Visibility In Bad Weather From A Single Image. CVPR, 2008. Thus, the attenuation term J(x)t(x) describes the decay of the scene irradiance J(x) due to scattering as the scene irradiance J(x) traverses the media.

The second term, A(1−t(x)) represents the airlight as it arrives at the image capture device 14 and is described further in H. Koschmieder. Theorie der Horizontalen sSchtweite. Beitr. Phys. Freien Atm., 12:171-181, 1924. 1, 2 and in Tan (supra). The airlight term A(1−t(x)) illustrates that airlight depends on the overall atmospheric light A as well as the transmission t(x) of the media. An inspection of Eq. 1 reveals that the airlight varies inversely with the transmission t(x) and, hence, proportionally with the depth d of the objects in the scenes 12. This result arises from the nature of the transmission t(x) as being that portion of light that is not scattered by the media through which it travels.

Recovering Scene Irradiance J(x)

Having disclosed a hazy image model (Eq. 1) it might be useful at this juncture to further disclose how de-hazing systems 10 of various embodiments apply the image model of Eq. 1 (among others) to de-haze images. To recover the de-hazed image 100 from the hazy image 102, de-hazing systems 10 determine (from the observed intensity I(x)) the scene irradiance J(x). These de-hazing systems 10 can also recover the atmospheric light A, the transmission t(x), and associated depths d(x) from the observed intensity I(x) of a single hazy image 102 of a scene 12.

Figure 5:
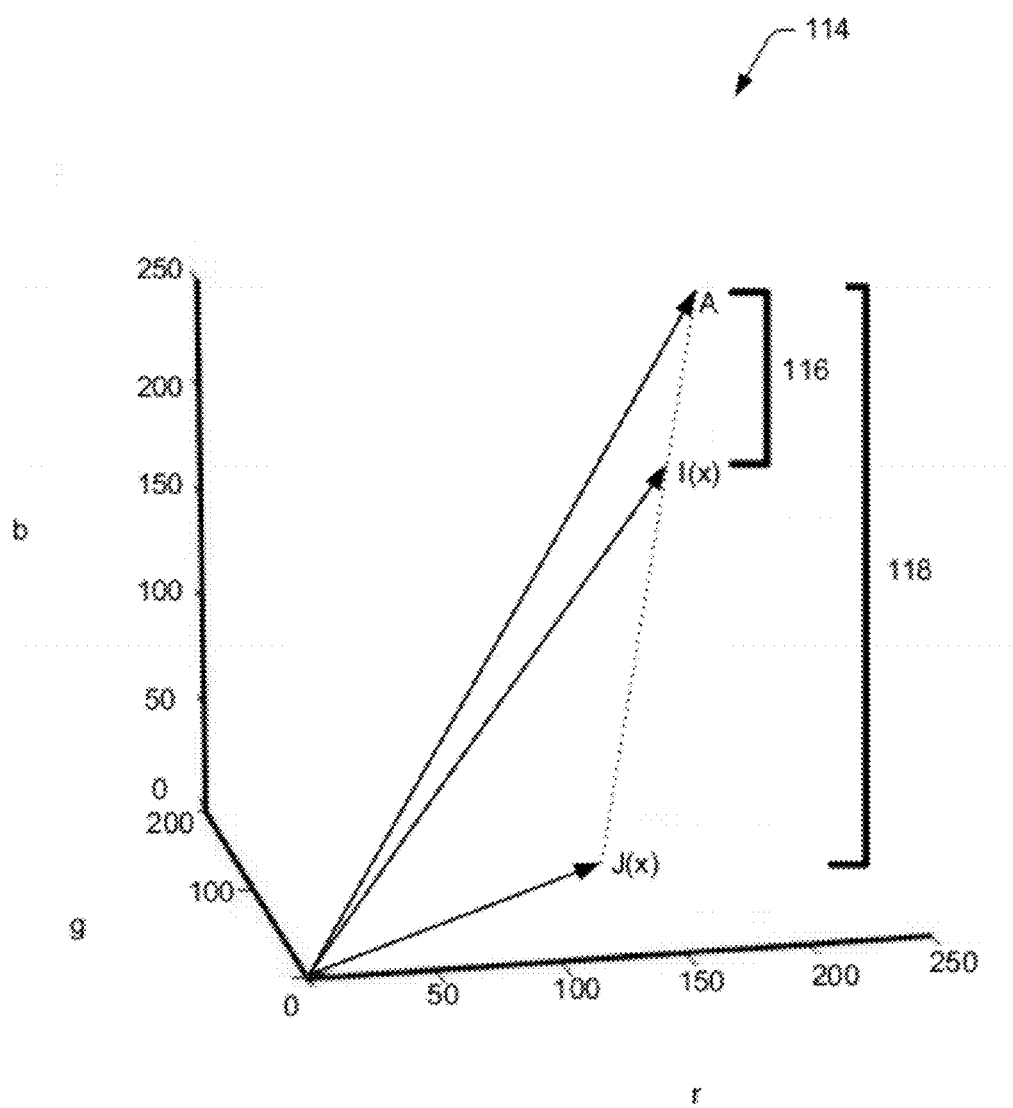
FIG. 5 is a diagram illustrating an exemplary geometric model of a hazy image.

With reference now to FIG. 5, the hazy image model of Eq. 1 means that (in RGB or other color spaces) the matrix terms I(x), J(x)t(x), and A(1−t(x)) representing respectively, the observed intensity, the scene irradiance, and the airlight (as they are captured in, or otherwise recoverable from, the hazy image 102) are coplanar. Moreover, their end points are co-linear as shown in the hazy image model 114 of FIG. 2. FIG. 2 also illustrates that the transmission t(x) in the hazy image model 114 is the ratio of the two line segments 116 and 118 or mathematically:

$$t(x) = \|A - I(x)\| / \|A - J(x)\| = (A^c - I^c(x))/(A^c - J^c(x)) \quad \text{Eq. 3}$$

Where c is a color channel index with values including r, g, and b representing respectively, the red, blue, and green color channels of some embodiments.

Returning now to considerations regarding dark channel priors, an assumption underlying some embodiments is that scenes 12 observed in the absence of haze include many objects having colors with low intensities on at least one color channel c. These minimal intensity channels (i.e., dark channels) can vary between objects, portions of objects, and local patches 110 in hazy images 102. As a result, the vast majority of local patches 110 (and many individual pixels 108 and 112) of typical hazy images 102 exhibit low intensity on at least one color channel c. While these low intensities in the hazy images 102 might not be exactly equal to zero, the low intensities will often reflect contributions from only 1) the zero or near-zero intensity of a particular color originating from a portion of an object and 2) the airlight associated with the corresponding local patch 110 (or pixel 108 or 112) of the hazy image 102.

De-hazing systems 10 of embodiments mathematically treat this minimum intensity or dark channel intensity $J_{dark}$ for non-sky local patches as follows:

$$J_{dark}(x) = \min_{c \in \{r,g,b\}} (\min_{y \in \Omega(x)} (J^c(y))) \quad \text{Eq. 4}$$

Where $J^c$ is the intensity of the color channel of the scene irradiance J(x) corresponding to the color channel index c and Ω(x) is the local patch 110 at the location x in the scene 12. Thus, for hazy images 102 the observed dark channel intensity $J_{dark}$ tends to be zero and, if not, then generally low.

Three factors, among others, gives rise to the low dark channel intensity $J_{dark}$. First, although not necessarily more important than the other factors, shadows create local areas of relatively low intensity regions where they happen to occur. Various objects create these shadows including, but not limited to, cars, buildings, windows (opening into relatively dark interior spaces of buildings), leaves, trees, rocks, etc. Also, monochromatic or nearly monochromatic (or more colloquially, "colorful") objects lack intensity in at least one color channel c and give rise to a zero, or near zero, dark channel intensity(s) $J_{dark}$. For instance, green trees or plants (such as grass) correspond to dark channels in the red and blue color channels. Similarly, black (or darkened) objects and surfaces tend to create dark channels across all three color channels c. As a result, many local patches 110 exhibit one or more dark channels which can be used to determine the transmission t(x) for the corresponding local patches 110. As disclosed herein, with the transmission t(x) being known, the atmospheric light A and the scene radiance J(x) can be determined to recover a de-hazed image 100 from a single hazy image 102 even in the presence of heavy haze.

Figure 6:
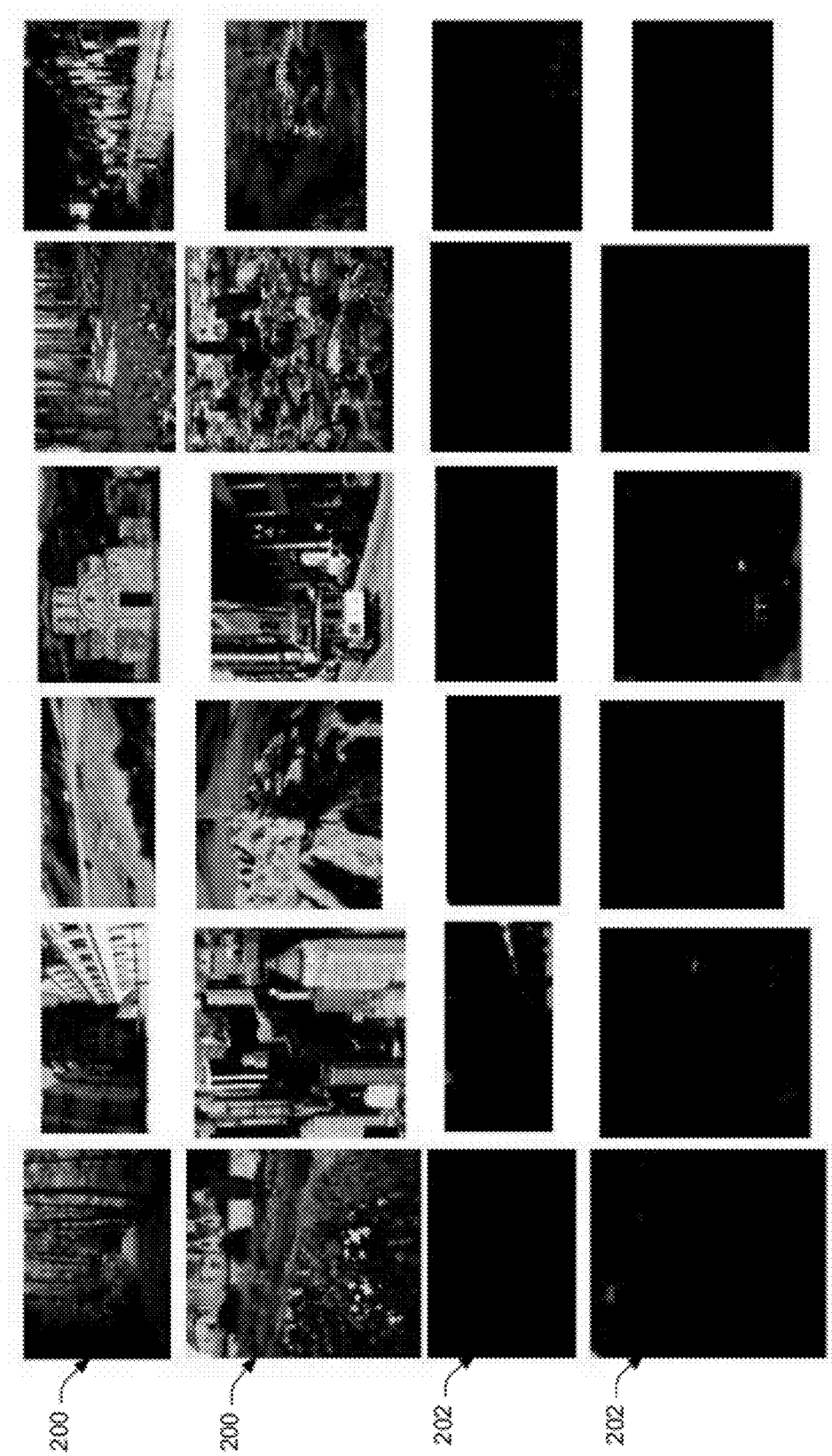
FIG. 6 is a diagram illustrating an exemplary series of hazy images and a series of dark channels thereof.

Furthermore, with reference now to FIG. 6, the foregoing dark channel priors were verified experimentally. More particularly, outdoor images 200 were gathered from flickr.com which were associated with the 150 most popular search tags therein (as annotated by the users of flickr.com). These images 200 appear to be relatively haze-free. Yet, even on so-called clear days, haze exists. Thus, these images 200 were considered to be representative of challenging experimental conditions under which to verify the dark channel priors of embodiments. From these images 5000 outdoor images 200 were randomly selected for further consideration. The sky regions were then cropped from the images 200 and the size of the local patches 110 was set to 15 by 15 pixels. However, any size of local patch 110 could have been employed. The dark channels 202 of the images 200 were then determined.

Figure 7:
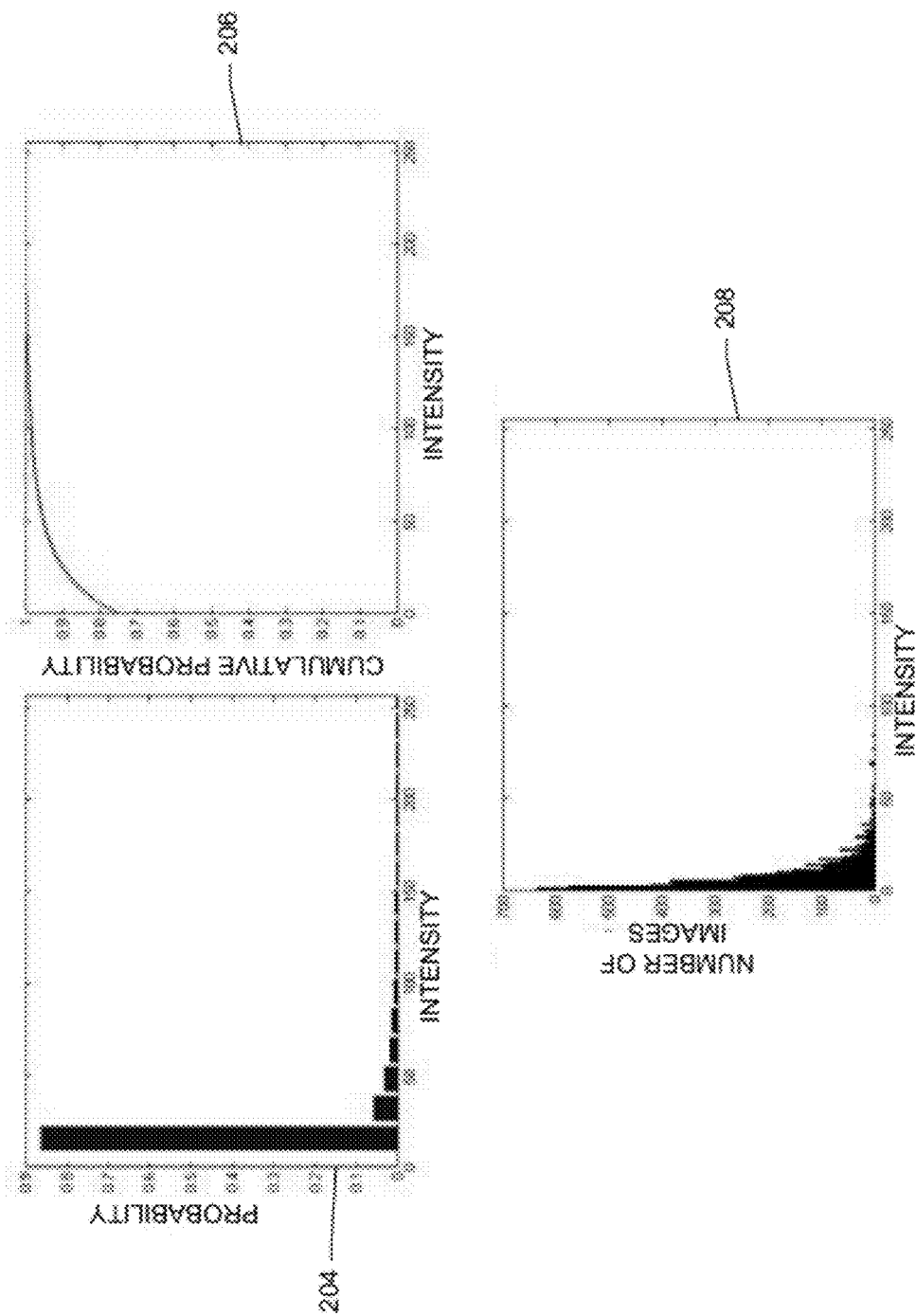
FIG. 7 are graphs illustrating an exemplary statistical treatment of dark channels.

With reference now to FIG. 7, the drawing illustrates the results of a statistical treatment of the dark channels 202 of the images 200 (see FIG. 6). Histogram 204 illustrate the observed intensity of the dark channels 202 of all of the pixels 108 and 112 in all of the 5000 images 200. More specifically, histogram 204 illustrates the average intensities of these dark channels 202 for 16 equally-sized frequency (i.e. color) bins. As is apparent, the vast majority of the pixel related dark channels 202 occur at or near zero intensity. FIG. 7 further illustrates the validity of the dark channel priors disclosed herein via a cumulative distribution graph 206. From FIG. 7, it is observed that about 75% of the pixels 108 and 112 have dark channel intensities $J_{dark}$ of approximately zero. Furthermore, 90% of the dark channels intensities $J_{dark}$ are below 25% of the saturation value. Distribution graph 208 further illustrates that the vast majority of the dark channel intensities $J_{dark}$ are approximately 0. Accordingly, the experimental results illustrated by FIG. 7 provide experimental support for the dark channel priors disclosed here.

Recovering Depth Maps

As mentioned previously, embodiments provide de-hazing systems 10 for determining the depth d of objects in scenes 12 from the haze associated therewith.

Generally, the overall brightness of a hazy image 102 (or portion thereof) increases as the density of the haze (i.e., the attenuation of the scene irradiance J(x)) and the airlight contribution to the observed intensity I) increases. Therefore, due to the airlight, hazy images 102 will be brighter than the corresponding de-hazed images 100 in which the retained transmission t(x) is zero or low. As a result, the dark channel intensity $J_{dark}$ of hazy portions 106 of hazy images 102 will have higher intensity in portions affected by denser haze. Embodiments, therefore, use the dark channel intensity $J_{dark}$ as an approximation of the thickness of the haze effecting hazy images 102. Since haze increases with depth d, the dark channel intensity $J_{dark}$ results yield depth maps. More particularly, to recover de-hazed images 100 and/or to yield depth maps, de-hazing systems 10 of various embodiments use the foregoing observations to estimate the transmission t(x) and the atmospheric light A.

Given a hazy image 102, these de-hazing systems 10 assume a value for the atmospheric light A associated therewith. Any reasonable estimate of the atmospheric light A will yield satisfactory results. Moreover, the estimate can be obtained from a light meter, a look up table based on the time-of-day, a look up table based on location, etc. or combinations of these techniques. Furthermore, these de-hazing systems 10 treat the transmission ~t(x) of a local patch Ω(x) as a constant. These de-hazing systems 10 also perform the minimization operation of Eq. 5 independently for each of the three color channels c (for embodiments providing red-blue-green imaging systems 10) thereby yielding:

$$\min_{y \in \Omega(x)}(I^c(y)) = \tilde{t}(x)\min_{y \in \Omega(x)}(J^c(y)) + (1-\tilde{t}(x))A^c \qquad \text{Eq. 5}$$

Stated differently, Eq. 5 can be expressed as Eq. 6:

$$\min_{y \in \Omega(x)}(I^c(y)/A^c) = \tilde{t}(x)\min_{y \in \Omega(x)}(J^c(y)/A^c) + (1-\tilde{t}(x)) \qquad \text{Eq. 6}$$

In addition, de-hazing systems 10 of the current embodiment perform another minimization operation among the color channels c starting with Eq. 6 to yield Eq. 7:

$$\min_c(\min_{y \in \Omega(x)}(I^c(y)/A^c)) = \tilde{t}(x)\min_c(\min_{y \in \Omega(x)}(J^c(y)/A^c)) + (1-\tilde{t}(x)) \qquad \text{Eq. 7}$$

Recalling that, according to some of the dark channel priors disclosed herein, the dark channel intensity $J_{dark}$ of the haze-free scene irradiance J(x) tends to be zero:

$$J_{dark}(x) = \min_c(\min_{y \in \Omega(x)}(J^c(y))) = 0 \qquad \text{Eq. 8}$$

As the atmospheric light A' is always positive, Eq. 8 leads to:

$$\min_c(\min_{y \in \Omega(x)}(J^c(y)/A^c)) = 0 \qquad \text{Eq. 9}$$

Combining Eq. 7 and Eq. 9 yields Eq. 10 which can be used by de-hazing systems 10 to estimate the local patch transmission ~t(x):

$$\tilde{t}(x) = 1 - \min_c(\min_{y \in \Omega(x)}(I^c(y)/A^c)) \qquad \text{Eq. 10}$$

Since the term min$_c$ (min$_{y \in \Omega(x)}$(I$^c$(y)/A$^c$)) is the dark channel intensity $J_{dark}$ of the normalized (with regard to the corresponding color of the atmospheric light A$^c$), the normalized, observed intensity I$^c$(y)/A$^c$ of the hazy image 102, Eq. 11 provides an estimate of the transmission t(x) for non-sky regions of the hazy images 102.

As mentioned previously, even though the dark channel priors described herein do not necessarily hold for sky regions of hazy images 102, applying the foregoing equations to sky regions still yields useful results. This result arises from the color of the sky regions being similar to that of the atmospheric light A. Thus, for most sky regions the dark channel intensity $J_{dark}$ approaches saturation or mathematically:

$$\min_c(\min_{y \in \Omega(x)}(I^c(y)/A^c)) \to 1 \qquad \text{Eq. 11}$$

Moreover, since these sky regions have essentially infinite depth d optically (or at least a depth sufficiently large as to maximize the atmospheric light A scattered into the line of sight of the image capturing device 14 and to maximize the scene irradiance J(x) scattered out of the line of sight of the image capture device 14), for local patches 110 of sky regions:

$$\tilde{t}(x) \to 0 \qquad \text{Eq. 12}$$

Thus, Eq. 10 gracefully handles both sky regions and non-sky regions of hazy images 102. As a result, sky regions need not be cropped from, or otherwise treated separately from non-sky regions of hazy images 102 to obtain satisfactory results.

Retaining Aerial Perspective

However, as previously noted, haze happens to provide human viewers clues as to the depth d of objects in the scenes 12 even on clear days (when some haze is present nonetheless). This depth-related information arises from the increase in the effects of haze with depth d. As a result, human viewers associate increased haze with increased depth d. Herein, this phenomenon is termed "aerial perspective." Should the effects of haze be removed entirely from the hazy images 102, the depth-related information might be eliminated from the resulting de-hazed images 100 along with aerial perspective.

To retain aerial perspective, and perhaps for other purposes as well, de-hazing systems 10 of some embodiments remove only a fraction of haze INDUCED effects from the hazy images 102 as they recover the de-hazed images 100. The fraction of the haze effects retained in the de-hazed images 100 can be user selected although the retained fraction is often rather small (a few percent in many cases). Moreover, the retained portion can vary with depth d if desired. For instance, more haze effects can be retained for distant objects as compared to close objects. Some de-hazing systems 10 therefore use a modified version of Eq. 11 to determine the transmission ~t(x) of a local patch. See Eq. 13:

$$\tilde{t}(x) = 1 - \omega\min_c(\min_{y \in \Omega(x)}(I^c(y)/A^c)) \qquad \text{Eq. 13}$$

Where ω represents a use selected parameter enabling the retention of a corresponding fraction of the haze effects in the de-hazed images 100. Typically, though not always, the parameter ω has a range of between 1 and 0, inclusive. While the parameter ω may be selected based on the application for which the de-hazed images 100 are sought, in many cases a value of 0.95 for the parameter ω will suffice.

Soft Matting Transmission Maps

While de-hazing systems 10 of some embodiments treat the transmission ~t(x) within a local patch 110 as constant, de-hazing systems 10 of other embodiments do not. Rather, some de-hazing systems 10 eliminate (or minimize) block effects that might arise from treating the local patch transmission ~t(x) as a constant by applying (soft) matting techniques to refine the de-hazed images 100. In this regard, it might be useful to note that Eq. 1 has a form similar to an image matting equation. Furthermore, it might be useful to note that a transmission map is an alpha map. De-hazing systems 10 of the current embodiment, therefore, treat the transmission t(x) and the local patch transmission ~t(x) as vectors t and ~t (or matrices) in soft matting equation Eq. 14 which minimizes a cost function:

$$E(t) = t^T L t + \lambda(t-\tilde{t})^T(t-\tilde{t}) \qquad \text{Eq. 14}$$

Where L is a Matting Laplacian matrix as proposed by Levin et al in A. Levin, D. Lischinski, and Y. Weiss. A Closed Form Solution to Natural Image Matting. CVPR, 1:61-68, 2006.) and λ is a regularization parameter. The first term of Eq. 15 can be referred to as a smoothing term while the second term can be referred to as a data term. With further reference to Eq. 14, de-hazing systems 10 of the current embodiment define the (i,j) element of the matrix L as:

$$\sum_{k|(i,j) \in w_k} \left( \delta_{ij} - \frac{1}{w_k}\left(1 + (I_i - u_k)^T\left(\sum_k + \frac{\varepsilon}{w_k}U_3\right)^{-1}(I_j - u_k)\right)\right) \qquad \text{Eq. 15}$$

Where $I_i$ and $I_j$ are the color channels c of the input hazy image 102 at the pixel 108 designated by i and j; $\delta_{ij}$ is the Kronecker delta; $\mu_k$ and $\Sigma_k$ are the mean and covariance matrices of the color channels c in the window $w_k$; $U_3$ is a 3 by 3 identity matrix (or other-sized identity matrix); ε is a regularizing parameter; and $|w_k|$ is the number of pixels in the window $w_k$ (i.e., the local patch 110 under consideration). Thus, Eq. 15 yields de-hazed images 100 refined so as to account for a transmission t(x) that might vary within a local patch 110.

Figure 8:
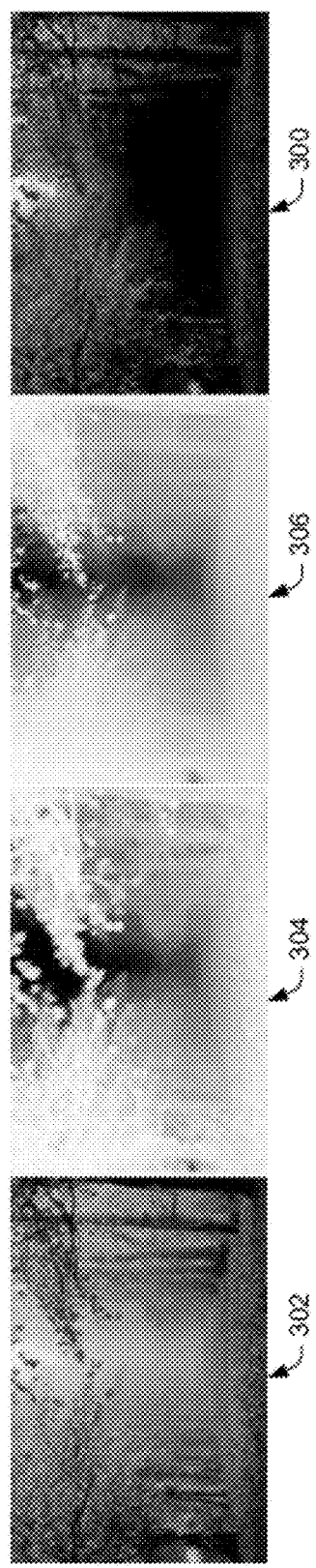
FIG. 8 are diagrams illustrating a hazy image, a transmission map, a refined transmission map, and a de-hazed image of a scene.

FIG. 8 illustrates a de-hazed image 300 experimentally recovered from a hazy image 302 using the soft matting technique underlying Eq. 15. More specifically, FIG. 8 illustrates the hazy image 302; an estimated transmission map 304; a soft matted (using Eq. 15) transmission map 306; and the de-hazed image 300 recovered using the soft-matted transmission map 306. In this situation (as in many others), the system 10 recovered many sharp edge discontinuities, outlines, and profiles of the objects in the captured scene 12. See the de-hazed image 300 of FIG. 8.

In the alternative, or in addition, de-hazing systems 10 of some embodiments obtain a refined transmission t(x) by solving a linear system such as the sparse linear system of Eq. 16:

$$(L+\lambda U)t = \lambda \tilde{t} \qquad \text{Eq. 16}$$

Where U is an identity matrix of the same size as the Matting Laplacian matrix L. De-hazing systems 10 of the current embodiment typically set a relatively small value on λ (0.0004 in some systems) so that the determined transmission t(x) is softly constrained by the local patch transmission ~t(x). The application of the foregoing equations by de-hazing systems 10 therefore refines a relatively coarse, local patch transmission ~t(x) to yield a refined, determined transmission t(x) of the underlying scene 12.

Considerations Regarding Noise

As described previously with regard to FIG. 1, de-hazing systems 10 of various embodiments can recover the scene irradiance J(x) via Eq. 1 (with or without the image refinement techniques disclosed herein). However, noise can affect the de-hazed images 100 in situations in which the attenuation term J(x)t(x) of Eq. 1 is low. For instance, the scene 12 might be poorly lit (i.e. the scene irradiance J(x) is low or the scene 12 otherwise exhibits low brilliance). To aid in de-hazing hazy images 102 in such situations, de-hazing systems 10 of some embodiments establish a lower bound $t_0$ for the determined transmission t(x). These systems 10, therefore, set the transmission t(x) to the greater of the determined transmission t(x) or the lower transmission bound $t_0$. As a result, the hazy images 102 will be processed as if they exhibit some amount of associated transmission t(x) regardless of the amount of haze present in the scenes 12. Often, a lower transmission bound $t_0$ of around 0.1 produces satisfactory results. Mathematically, Eq. 17 illustrates recovering the scene irradiance J(x) using the lower transmission bound $t_0$. Thus, de-hazing systems 10 which use Eq. 17 exhibit greater noise resistance than would otherwise be the case.

$$J(x) = A + (I(x) - A)/\max(t(x), t_0) \qquad \text{Eq. 17}$$

Restoring Brillance

In some situations, de-hazing images results in de-hazed images 100 which possess less brilliance than the hazy images 102 from which they were recovered. This situation arises because the haze contributes to the overall observed intensity I(x) of the hazy images 102. De-hazing images therefore can remove that contribution from the observed intensity I(x) captured in the hazy images 102. For these reasons, among others, the scene irradiance J(x) exhibits at most the brightness of the atmospheric light A and frequently less (in the absence of light sources in the scenes 12). Thus, the de-hazed images 100 sometimes exhibit only the comparatively lower brightness of the scene irradiance J(x). In other words, to human viewers some de-hazed images 100 appear comparatively dim. If desired, therefore, embodiments allow the brightness of the recovered scene irradiance J(x) to be increased by applying an amplification term thereto. For instance FIG. 8 illustrates a de-hazed image 300 in which the recovered scene irradiance J(x) was amplified.

Determining Atmospheric Light

Figure 9:
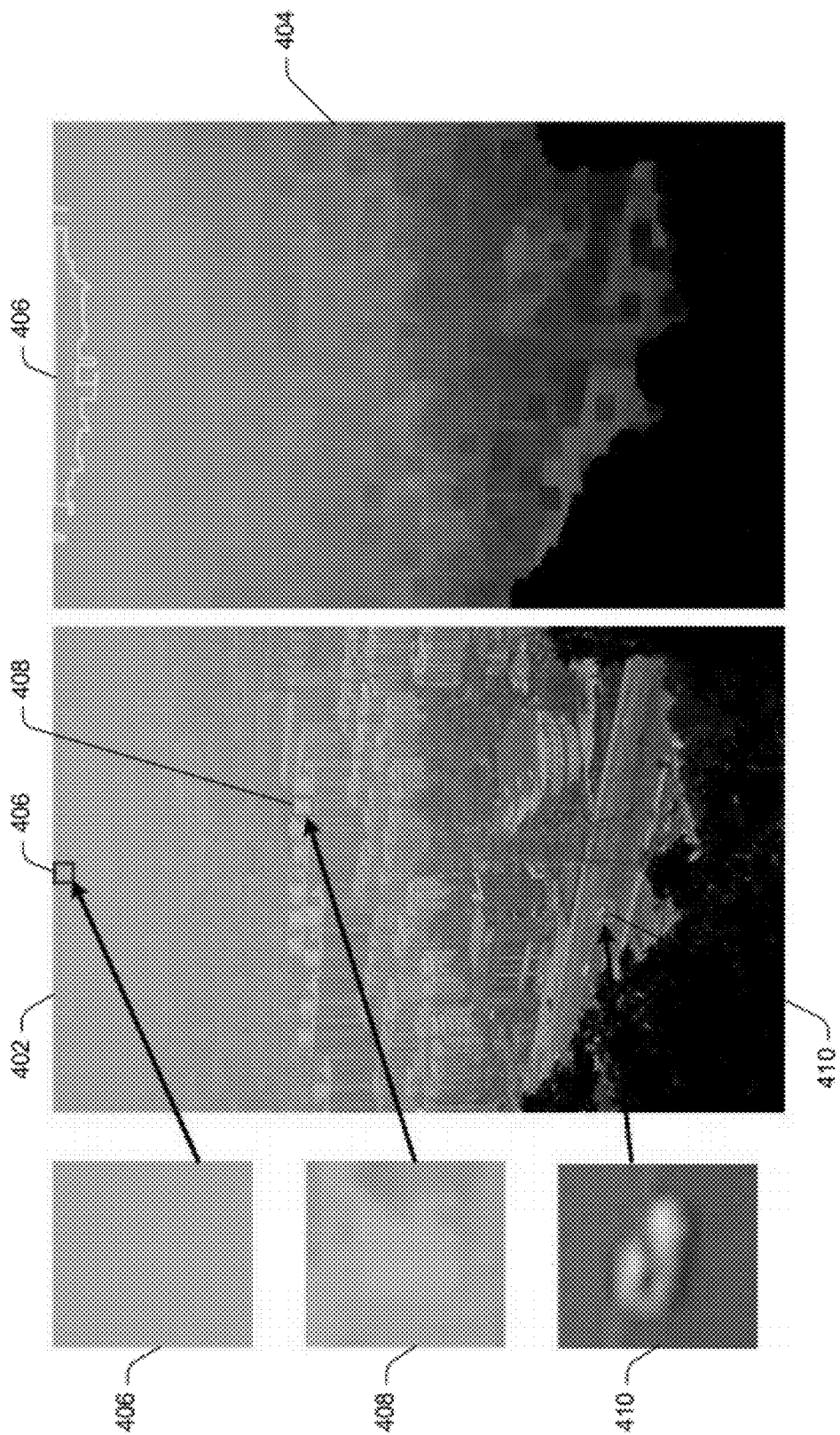
FIG. 9 is a diagram illustrating a hazy image and a dark channel thereof.

With reference now to FIG. 9, and as mentioned previously, de-hazing systems 10 of some embodiments determine the atmospheric light A from a single hazy image 102. FIG. 9 illustrates one such hazy image 402 and its dark channel 404. More particularly, the hazy image 402 includes one or more dense haze portions 406. Typically, dense haze portions 406 are associated with distant objects and the particular dense haze portion 406 is the most haze dense portion of the hazy image 402. Thus, the intensity of the dense haze portion 406 generally exhibits only the intensity contributed by the dark channel $J_{dark}$ of that portion of the hazy image 402. Moreover, it may be useful to note that FIG. 9 illustrates two particular portions 408 and 410 which exhibit greater brightness than the most dense haze portion 406. Closer inspection of these bright portions 408 and 410 revealed that they captured, respectively, a white building and a white car. These bright portions 408 and 410 could have contained other bright objects such as white rocks, light sources, etc. without departing from the scope of the disclosure.

Nonetheless, de-hazing systems 10 of the current embodiment use the dense haze portion 406 (instead of the bright portions 408) to determine the atmospheric light A. However, it might happen that these de-hazing systems 10 use one of the bright portions 410 in certain situations. For instance, should one of the bright portions 410 happen to be the most (or one of the most) haze dense portion, de-hazing systems 10 can use the bright portion 08 to determine the atmospheric light A. Thus, despite the presence of bright portions 408 in the hazy images 402, de-hazing systems 10 of the present embodiment can determine the atmospheric light A (and/or de-haze the hazy images 402). As the foregoing makes apparent, de-hazing systems 10 of the current embodiment do not necessarily select the brightest portion of the hazy image 402 from which to determine the atmospheric light A. Instead, de-hazing systems 10 of embodiments use dark channel priors to determine the most haze dense portions of the hazy images 402 and to estimate the atmospheric light A there from.

More particularly, some de-hazing systems 10 select the pixels 108 and 112 of the hazy image 102 having the 0.1% (or some other threshold) brightest dark channel intensities $J_{dark}$. These selected pixels 108 and 112, therefore according to the dark channel prior of the current embodiment, represent the most haze-dense portions of the hazy image 402. Furthermore, these de-hazing systems 10 further select (from the bright dark channel pixels 108 and 112), the pixel(s) 108 or 112 with the highest observed intensity I(x). These de-hazing systems 10 set the atmospheric light A equal to the intensity of this brightest dark channel pixel 108 or 112.

Thus, de-hazing systems 10 of the current embodiment select the pixels 108 and 112 with the brightest dark channel intensities $J_{dark}$ and, from these pixels 108 and 112, select the pixel 108 or 112 having the brightest observed intensity I(x) as corresponding to the atmospheric light A. As a result, the pixel 108 or 112 used to estimate the atmospheric light A might not be the brightest pixel 108 or 112 in the hazy image 402. Thus, bright (and white) objects in the scene 12 have little or no effect on the determination of the atmospheric light A. Nor do these bright objects effect the determination of the transmission t(x) or the removal of haze effects from the hazy image 402. Accordingly, embodiments provide more robust de-hazing systems 10 than heretofore available.

Exemplary Results

Figure 10:
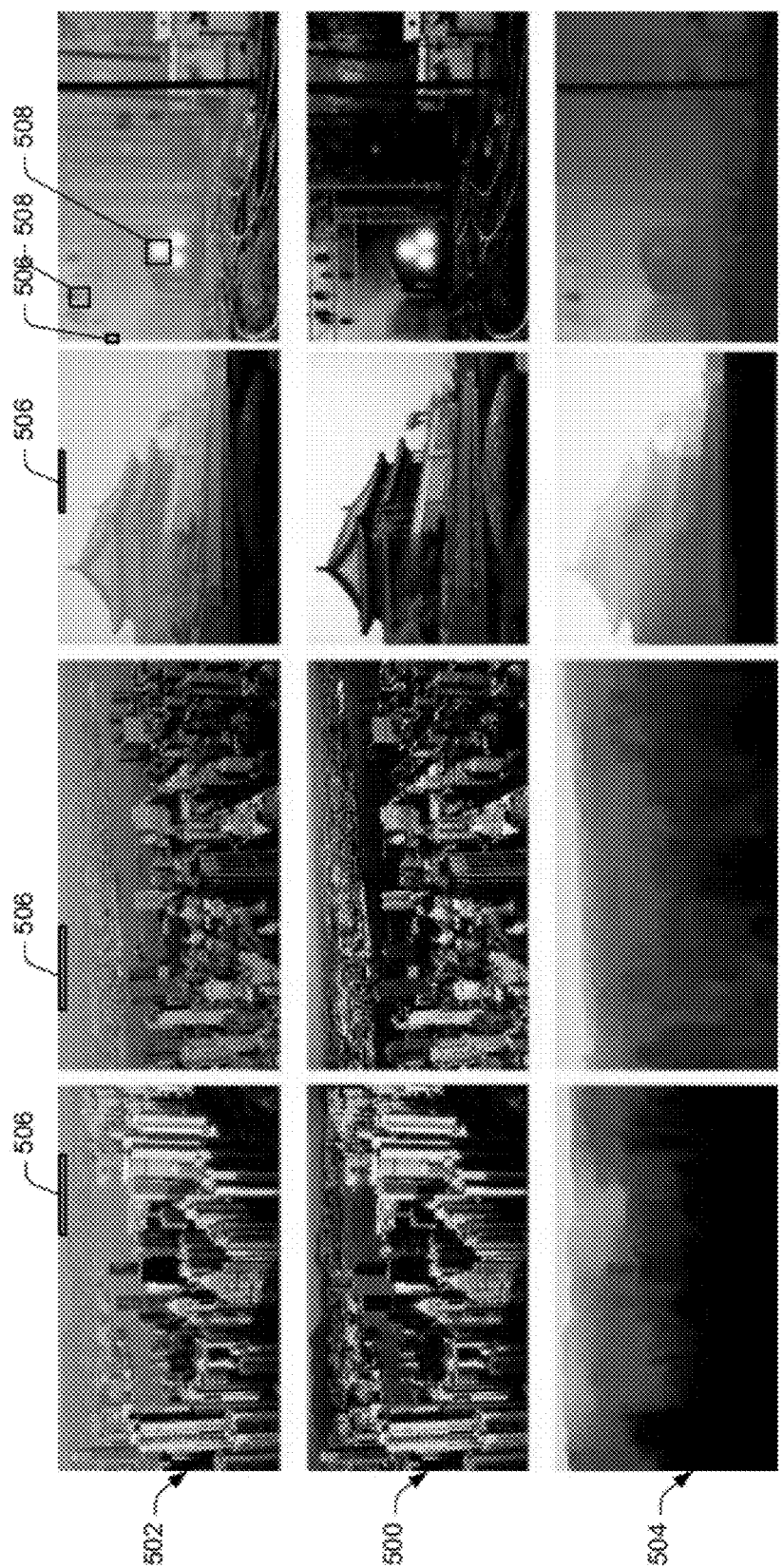
FIG. 10 is a diagram illustrating a series of hazy images, de-hazed images, and depth maps of city scenes.

FIG. 10 further illustrates exemplary achievable results flowing from embodiments. For instance, FIG. 10 illustrates a series of de-hazed images 500 recovered from hazy images 502 by an experimental system 10. Furthermore, FIG. 10 illustrates depth maps 504 obtain by the same system 10. Note that this experimental system 10 used dense haze portions 506 to obtain estimates of the atmospheric light A in hazy images 502 despite the presence of bright portions 508 (for instance, locomotive and/or signal lights) in the hazy images 502.

The experimental system 10 used the fast algorithm as documented by Van Herk (see M. van Herk. A Fast Algorithm For Local Minimum And Maximum Filters On Rectangular And Octagonal Kernels. Pattern Recogn. Lett., 13:517-521, 1992.) for the "min" operator in the equations disclosed herein. It might be useful to note that this particular fast algorithm is linear with respect to image size. Moreover, the local patches 110 were sized at 15 by 15 pixels although other local patch sizes (and "min" algorithms) could have been used. In addition, the transmission t(x) was refined using a soft matting technique which included a Preconditioned Conjugate Gradient (PCG) algorithm as the solver. Furthermore, the depth maps 504 of FIG. 10 were obtained using the exponential form of the transmission t(x) as described by Eq. 2. A 3.0 GHz Intel Pentium® processor of the experimental system 10 took only 10-20 seconds to process the 600 by 400 pixel images of FIG. 10. Moreover, the experimental system 10 obtained the atmospheric light A of each hazy image 502 using techniques disclosed herein.

More particularly, the experimental system 10 unveiled details and recovered color information even 1) in very haze dense regions 2) with little color variance, 3) where the colors were faint, and/or 4) in black portions of the hazy images 502 (for instance regions which captured shadowed areas such as those behind buildings and/or mountainsides). Moreover, the experimental system 10 estimated the depth maps 504 and obtained sharp results (i.e., de-hazed images 500) corresponding to the hazy images 502 input into the experimental system 10. These depth maps 504 are physically valid with the scenes 12 captured in these hazy images 502. Furthermore, the experimental system 10 obtained these results without: 1) over saturating the resulting de-hazed images 500, 2) under estimating the transmission t(x), 3) sacrificing color fidelity, 4) producing significant halo effects, 5) using three dimensional models of the captured scenes 12 (for instance, those maps available from Google Earth®), 6) using texture maps of the scenes 12 (for instance those obtainable from satellite images), or 7) using other apriori geometric information pertaining to the scenes 12.

Figure 11:
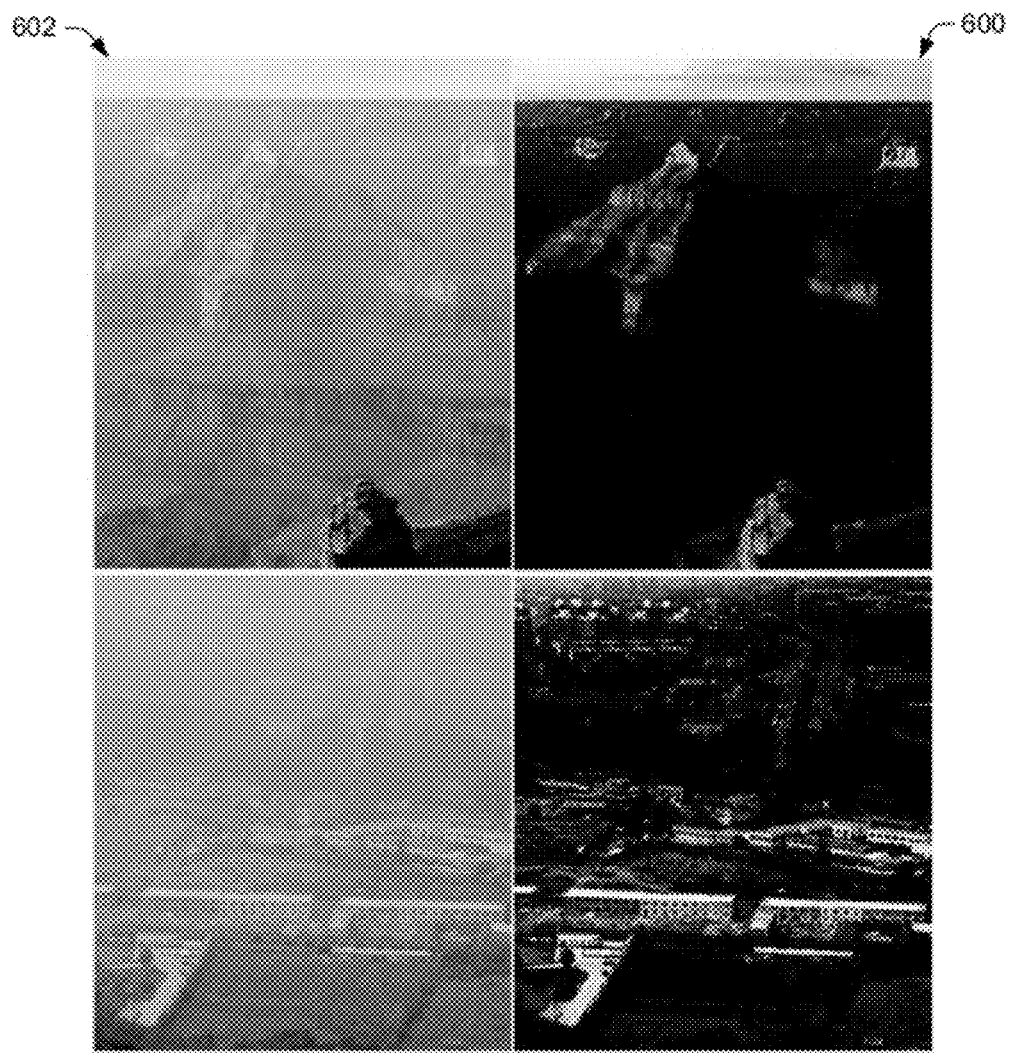
FIG. 11 is a diagram illustrating a pair of hazy images and de-hazed images of mountainous scenes.

Whereas FIG. 10 illustrates de-hazing hazy images 502 of a cityscape, FIG. 11 illustrates de-hazing images of shadowed mountainous regions and the like. More particularly, FIG. 11 illustrates a de-hazed image 600 of the Grand Canyon recovered from a hazy image 602. Thus, even in the presence of dark shadows (in the various crevices and ravines of the underlying scene 12), de-hazing systems 10 are able to recover satisfactory de-hazed images 600.

Figure 12:
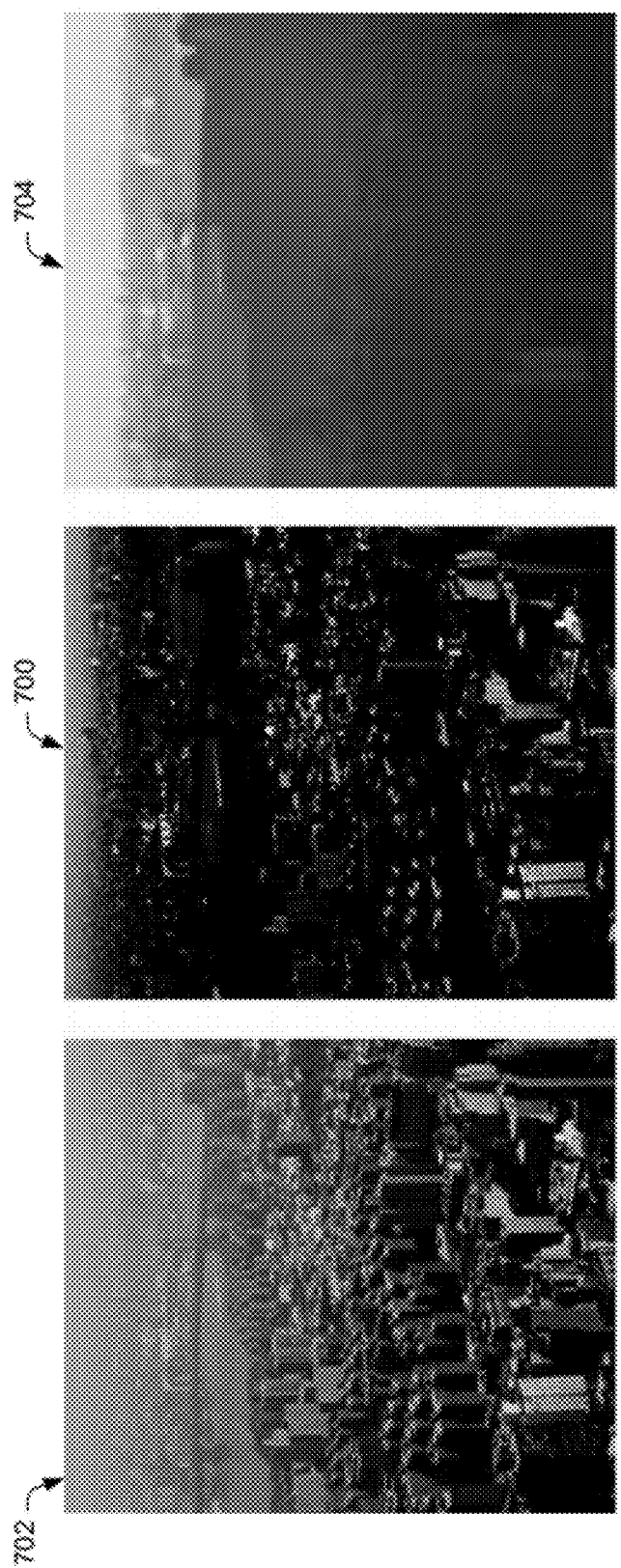
FIG. 12 are diagrams illustrating a gray-scale hazy image, de-hazed image, and a transmission map of a scene.

Moreover, de-hazing systems 10 of embodiments can operate on gray-scale hazy images 102 which include shadows. De-hazing systems 10 of these embodiments can omit the "$\min_c$" operator in the foregoing equations and instead use gray-scale soft matting (for instance, as described by Levin, supra). FIG. 12 shows the resulting de-hazed image 700 one such system 10 obtained on a particular gray-scale hazy image 702. FIG. 12 also illustrates a depth map 704 recovered from the de-hazed image 700 by that system 10.

Thus, embodiments provide systems and methods which use dark channel priors based on statistics obtained from single hazy images of various scenes to recover de-hazed images thereof. If desire, though, additional images could be used to achieve the foregoing results (or perhaps better results). Moreover, systems and methods of embodiments use hazy image models such as the hazy image model disclosed with reference to Eq. 1. Other hazy image models, however, could be used by such systems and methods without departing from the scope of the disclosure. For instance, a hazy image model which accounts for the sun's influence on the sky and/or regions in the scene near the sun could be used. In addition, or in the alternative, a hazy image model that accounts for increasing blue intensity near the horizon could be used.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of processing a hazy image including at least some haze effects, the method comprising:
    determining minimum intensity dark channels of each local patch of the hazy image establishing corresponding dark channel priors of each of the local patches;
    determining transmissions associated with each of the local patches using the corresponding dark channel priors, the corresponding minimum intensity dark channels, and an atmospheric light associated with the hazy image;
    recovering scene irradiances of the local patches using the corresponding dark channel priors, the corresponding determined transmissions, and the atmospheric light wherein the method is implemented on a processor and removes the haze effects from the hazy image to produce a de-hazed image; and
    outputting the de-hazed image.

2. The method of claim 1 further comprising applying a dark channel prior to a sky portion of the image.

3. The method of claim 1 further comprising retaining a portion of the haze effects in the de-hazed image.

4. The method of claim 1 further comprising soft matting a transmission of at least a portion of the hazy image into another portion of the hazy image.

5. The method of claim 1 further comprising setting the atmospheric light equal to an intensity of a portion of the hazy image having the largest transmission.

6. A method of processing a hazy image including at least some haze effects, the method comprising:
    determining a minimum intensity of a local patch of the hazy image;
    determining a transmission of the local patch using the minimum intensity and an atmospheric light associated with the image;
    recovering a scene irradiance of the local patch by removing the determined transmission from the local patch; and
    outputting the recovered scene irradiance wherein the method is implemented on a processor.

7. The method of claim 6, wherein the local patch corresponds to a sky region.

8. The method of claim 6 further comprising retaining a portion of the minimum intensity in the local patch.

9. The method of claim 6 further comprising soft matting the determined transmission of the local patch to another local patch of the hazy image.

10. The method of claim 9 wherein the soft matting technique is a gray-scale soft matting technique.

11. The method of claim 6 further comprising restricting the determined transmission to a lower bound.

12. The method of claim 6 further comprising setting the atmospheric light equal to an intensity of a pixel of the hazy image having the greatest transmission.

13. The method of claim 6 further comprising determining a depth of the local patch based on the determined transmission of the local patch.

14. The method of claim 6 wherein the image is a single frame of a sequential image.

15. A system comprising:
 a memory storing a hazy image including at least some haze effects;
 a display; and
 a processor in communication with the memory and the display and being configured to execute instructions stored in the memory for a method which includes:
  determining a minimum intensity of a local patch of the hazy image;
  determining a transmission of the local patch using the minimum intensity and an atmospheric light associated with the image;
  recovering a scene irradiance of the local patch by removing the determined transmission from the local patch; and
  outputting the recovered scene irradiance to the display.

16. The system of claim 15 wherein the method further includes soft matting the determined transmission of the local patch to another local patch of the hazy image.

17. The system of claim 16 wherein the soft matting technique is a gray-scale soft matting technique.

18. The system of claim 15 wherein the method further includes restricting the determined transmission to a lower bound.

19. The system of claim 15 wherein the method further includes setting the atmospheric light equal to an intensity of a pixel of the hazy image having the greatest transmission.

20. The system of claim 15 wherein the method further includes determining a depth of the local patch based on the determined transmission of the local patch.

* * * * *